United States Patent [19]
Webster

[11] 3,760,711
[45] Sept. 25, 1973

[54] APPARATUS IN THE FORM OF A KIT FOR HOME WINE MAKING

[75] Inventor: Robert B. Webster, Huntington Beach, Calif.

[73] Assignee: Plastimade, Inc., Van Nuys, Calif.

[22] Filed: Dec. 23, 1971

[21] Appl. No.: 211,180

[52] U.S. Cl. .................................. 99/277.1, 99/35
[51] Int. Cl. ............................................. C12h 1/22
[58] Field of Search .................. 99/276, 277, 277.1, 99/277.2, 278, 35, 36, 43, 29, 30; 220/63 R

[56] References Cited
UNITED STATES PATENTS

| | | | |
|---|---|---|---|
| 2,626,885 | 1/1953 | Gollings | 220/63 R |
| 3,123,248 | 3/1964 | Webb | 220/63 R |
| 229,934 | 7/1880 | Zwietusch | 99/277 |
| 467,757 | 1/1892 | Sessions | 99/276 |

Primary Examiner—Robert W. Jenkins
Attorney—Albert M. Herzig et al.

[57] ABSTRACT

An assembly or kit apparatus particulary adapted for home wine making by simplified wine making processes. The kit comprises a rigid container in the form of a barrel provided with upper and lower halves. A pair of flexible plastic bags are provided, each with a plastic fitting with cap, the fitting being adapted for accommodation to a bung hole in one-half of the barrel and also for connection to a tube which connects to a spigot forming part of the lower half of the barrel. The parts of the kit accommodate the processing of the wine and dispensing of it when ready through the barrel spigot from one of the plastic bags contained in the barrel.

12 Claims, 9 Drawing Figures

PATENTED SEP 25 1973 3,760,711

INVENTOR.
ROBERT B. WEBSTER
BY ALBERT M. HERZIG
EDWARD C. WALSH
ATTORNEYS

APPARATUS IN THE FORM OF A KIT FOR HOME WINE MAKING

SUMMARY OF THE INVENTION

The invention is an assembly to kit of parts forming an apparatus particularly adapted for home wine making using process steps generally conventional in the art.

Typically, in a home wine making process, wine is prepared from a concentrated base such as a grape base mixed with water, sugar, flavoring, yeast, and other ingredients or components such as Campden tablets. After the ingredients are mixed, they must be allowed to ferment over a period of time in a suitable container. After fermentation, the wine is strained through a appropriate strainer to remove sediment. At that time, a further Campden tablet may be crushed and added. The wine is allowed to stand to allow further sediment to settle. The wine is then filtered into an appropriate container from which it can be drawn off for use. Such container should be appropriate for this purpose.

The assembly or kit of parts of the herein invention is a combination of parts, particularly adapted to accommodate the steps in the handling of the wine up to the time that it is ready for use and at the same time to provide a suitable container from which the finished wine may be dispensed for drinking. In the preferred form of the invention, there is provided a rigid container, preferably in the form of a barrel which is split providing upper and lower halves. Then, there are provided a pair of plastic bags, each having a plastic fitting and cap, the fitting being adapted to be accommodated to a bung hole in the top half of the barrel, and also to accommodate connection to a flexible tube which can be connected to a spigot forming part of the lower half of the barrel. The plastic bags accommodate themselves to positioning in the barrel halves for purposes of fermentation of the wine; for transfer from one bag to the other while straining; for positioning in the lower half of the barrel; and connection by the flexible tube to the spigot. The parts contribute greatly to convenience in processing of the wine, for storing it during fermentation, and the ultimate dispensing of it using the same parts.

The primary object of the invention is to provide a simplified assembly or kit of parts, particularly adapted to accommodate the assembly to the steps involved in the process of home wine making, storing the wine, and dispensing it for drinking.

A further object resides in the provision of the particular major parts of the kit comprising the plastic bags with fittings as described, the rigid containter in the form of a barrel having upper and lower halves, and the spigot which is formed as a part of the lower part of the barrel and adapted for connection to one of the plastic bags by way of a flexible tube.

BRIEF DESCRIPTION OF THE DRAWINGS

Further objects and additional advantages of the invention will become apparent from the following detailed description and annexed drawings, wherein.

DESCRIPTION OF THE PREFERRED EMBODIMENT

Initially, in the preparation of the wine in a home wine making process, concentrated paste, such as grape paste, may be emptied into a container, such as a large plastic pail or pot. Warm water is added a little at a time and stirred constantly to break up and dissolve the paste. Sugar is then added and stirred until dissolved. The amount might be four cups, depending upon the quantity of wine being made. Flavoring is then added in accordance with the color of wine desired, such as red or white. A Campden tablet may then be crushed and stirred into the mix. The contents of a yeast packet with a small amount of water in a separate container are mixed with the contents and allowed to stand for at least ten minutes before adding. When the sugar and concentrate have cooled to room temperature, the yeast mixture is added and stirred. The foregoing steps may be done with very simple equipment, such as ordinary kitchen utensils. These steps having been carried out, the parts of the assembly or kit of the herein invention become very useful in accommodating the further steps of the wine making. The parts of the kit are illustrated in FIGS. 1 through 7.

Figure 6:
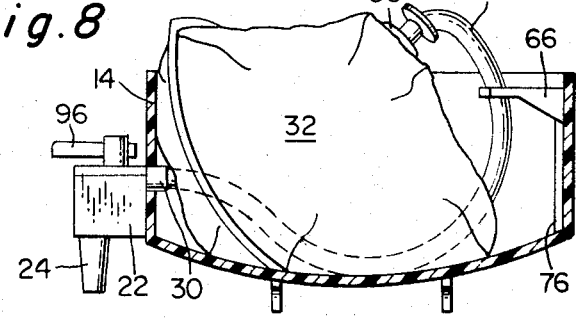
FIG. 6 is a view illustrating a flexible bag in the lower barrel half connected to the spigot for dispensing wine.

Numeral 10 designates the upper half of a rigid structure preferably in the form of a barrel having upper and lower generally semicylindrical parts such as shown. The barrel may be constructed of any suitable material, the upper half having a bung hole 12 with plug or bung 13 as shown. The lower half is designated at 14 as may be seen in FIGS. 3, 4, and 6. The lower half preferably has support members as designated at 16 and 18. At one end is a spigot generally designated at 22. This spigot has a body with an extending spout 24 and a manual operating handle 26. The spigot has an inwardly extending nipple 30 which extends through a hole in one end of the barrel part 14 as shown in FIG. 6. A flexible tube can be connected to the nipple as will be described. The spigot will be described more in detail presently.

The upper and lower halves 10 and 14 of the barrel may preferably be molded from plastic, each half having ends as shown. The halves are formed with mutually engageable tongues and slots. The tongues on the upper half are designated at 15 and 17 and on the lower half at 15' and 17'. The slots in the lower half are designated at 19, 21, and 23. The upper half has corresponding slots to receive the tongues or projections on the lower half.

The support members 16 and 18 preferably are of fanciful or artistic design as shown. The support or feet members have extending pins as shown at 21 and 23. The pins extend oppositely to similar pins fitted into receiving holes formd in the lower half of the barrel section. Preferably, also the support members or feet have projections extending from each foot towards the other foot with the ends of these projections joined together; these parts are not shown in the drawings. It is possible to stack units on each other either in a rectangular or pyramidal configuration. The barrels have receiving holes for pins like the pins 22 and 23 both at the top and bottom, one of the holes being designated at 25 in FIG. 1.

Figure 1:
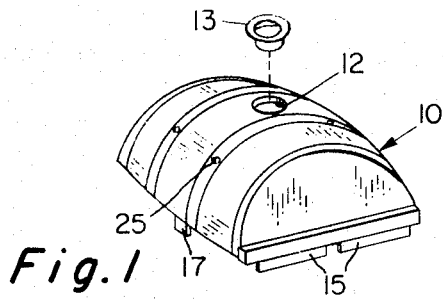
FIG. 1 is a perspective view of the upper half of the barrel.
Figure 2:
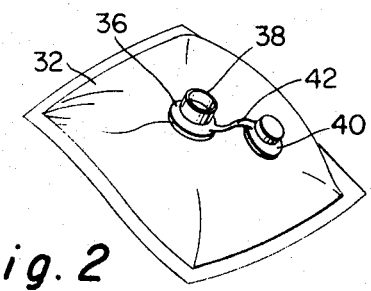
FIG. 2 is a perspective view of one of the flexible plastic bags.
Figure 3:
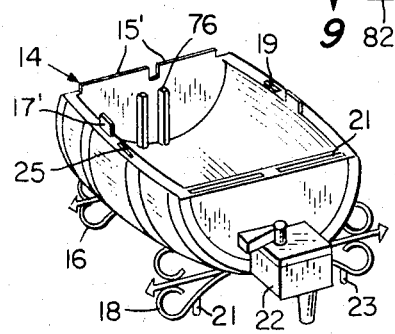
FIG. 3 is a perspective view of the lower half of the barrel.

FIG. 2 shows one of two flexible bags which may preferably be made of plastic being rectangular and sealed around the edges. One of these bags is designated at 32, and the other at 34. The bag 32 has a central plastic fitting 36 having an extending cylindrical flange 38 which may be closed by a cap 40 which fits into it. The cap is attached to the fitting by a band 42. Bag 34 has a similar fitting designated at 36'.

Figure 4:
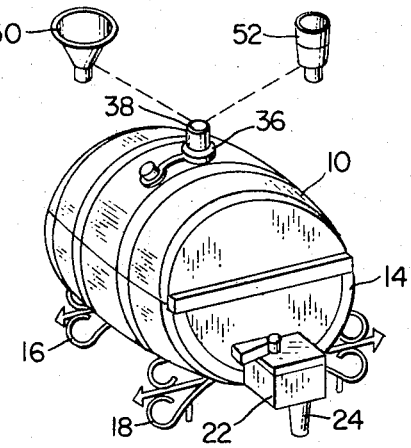
FIG. 4 is a perspective view of the assembled barrel with one of the plastic bag fittings extending through a bung hole in the top half of the barrel.

As may be observed, the upper barrel half 10 can be placed on the lower half as shown in FIG. 4 so that the two halves appear as a conventional barrel.

Figure 7:
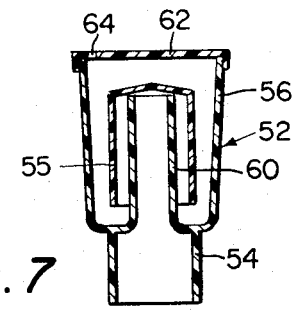
FIG. 7 is a cross sectional view of the valve or fitting which is connected to the wine container during fermentation.

In the drawings, numeral 50 designates an ordinary funnel. Numeral 52 designates a valve or fitting having a structure as shown in FIG. 7. It has a lower cylindrical part 54 of a size adapted to fit into the flange 38 of the bag fitting 36. The upper part of the valve 52 is cup-shaped as shown at 56. It has an integral, coaxially aligned, central tube part 60 which is aligned with the tubular part 54. A flanged cap 62 is provided with an orifice 64 in it. Numeral 55 designates a cup or thimble resting over the end of tube 60.

Numeral 66 designates a tube shut off member in the form of an angular bracket having an angle part 68 and a slot 70 in the other angle part adapted to receive a plastic tube 72 and to pinch it and shut if off. Numeral 74 designates a utensil in the form of an ordinary strainer. The parts of the kit adapt themselves to the steps of the process, and the handling of wine as described hereinafter.

Figure 8:
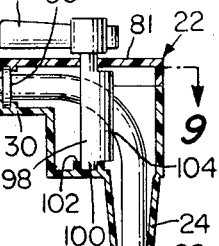
FIG. 8 is a cross sectional view of spigot 22.
Figure 9:
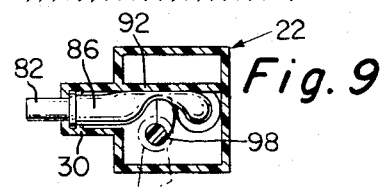
FIG. 9 is a cross sectional view taken along line 9—9 of FIG. 8.

Spigot 22 is illustrated in cross section in FIGS. 8 and 9. It is preferably molded of plastic being of rectilinear shape having an extending spout 80 as shown. As previously pointed out, the nipple part 30 fits into an opening in lower barrel half 14 and the end of tube 72 can be fitted into this nipple. FIG. 8 shows a vertical cross section of the nipple. The numeral 82 designates plastic fitting having a flange 84. This nipple can be fitted into the end of a short rubber tube 86. Flange 84 is held in position in the nipple 30 in an annular groove 90 provided inside of nipple 30. As may be seen in FIG. 9, the spigot has an internal partition wall 92 for a purpose which will be described. Numeral 96 designates a spigot operating handle which is on the end of cam stem 98 outside of spigot 22. The lower end of the cam stem as designated at 100 is journaled in a recess formed in boss 102 in the bottom wall of spigot 22. Stem 98 is eccentrically formed as shown so that cam surface 104 is formed on one side of it. Tube section 86 is between the partition wall and cam 104 on stem 98. By turning handle 96, stem 98 and cam 104 can be rotated to pinch or squeeze tube 86 between the cam surface and partition wall 92 as shown in FIG. 9 to shut off the flow. Thus as can be seen, the spigot 22 operates as a valve to turn on and off the flow through tube 72. This is accomplished simply by the pinching or squeezing of tube 86 and then releasing it. Spigot 22 is preferably formed in two parts, a lower part and a cover part 81 which fits onto the lower part. It may have a peripheral lip fitting inside the upper peripheral edge of the lower part.

After the mixture has been prepared as described in the foregoing, one of the plastic bags which might be a one gallon bag is placed into the bottom half of 14 of the barrel structure. The top cap, that is the flange 38, is inserted througn the bung hole 12 in the top half of the barrel 10 which is positioned over the lower half as shown in FIG. 4. The fit may be made tight simply by twisting the cap in the bung hole. The funnel 50 is inserted into the top half of the plastic bag and the entire contents as prepared as described in the foregoing are poured from the container through the funnel into the plastic bag, now enclosed within the barrel. Next, the water valve 52 is snapped on to the top cap 36 of the plastic bag, and the cover 62 of the valve is removed. The bag is filled with water up to a line marked on the valve, and the top of the valve is replaced.

Figure 5:
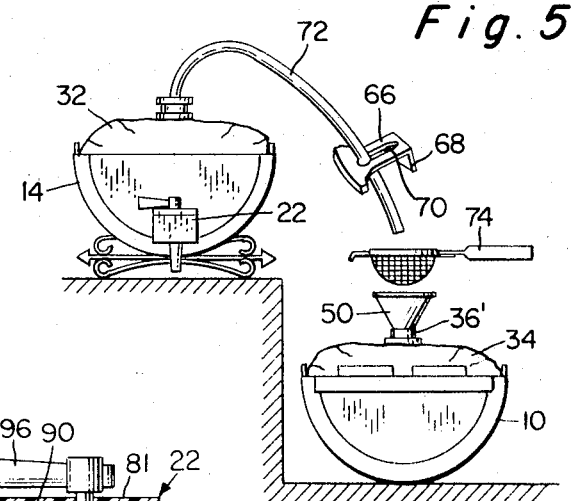
FIG. 5 is a view illustrating transfer of wine for straining from a flexible bag in one of the barrel halves into a flexible bag in the other barrel half.

The material is allowed to ferment and bubbles will appear in the valve around the inner tubular part 60 indicating fermentation within three days. Bubbling as described will continue for from 3 to 5 weeks, but bubbles becoming more frequent and then gradually tapering off as fermentation becomes complete. When bubbling ceases and fermentation is complete, the water valve is removed from the top cap 36 of the plastic bag, and the cover 40 is then snapped on. Next, the top half 10 of the barrel is removed and the lower half of the barrel 14 with a bag in it is positioned on a sink counter as shown in FIG. 5. The end of the plastic tube 72 has a similar fitting on it and is snapped on to the top cap 36 of the bag 32 as shown in FIG. 5. The upper half of the barrel can now be inverted and positioned as shown in FIG. 5 with the other bag 34 in it. Funnel 50 is placed into the top cap 36' of the bag 34 as shwon. The contents of the bag 32 can now be drained through the tube 72 and the strainer 74 into the bag 34 by a siphoning process. Flow of wine can be controlled by the flow control member 66. Sediment collected in the strainer 74 can be thrown away. At this point, a second crushed Campden tablet can be put into the wine in the plastic bag.

After the above procedure, the wine should be allowed to stand for three weeks with the bag in the barrel so that more sediment will settle to the bottom of the bag. At the end of the three weeks, the wine is poured through filter paper in the funnel 50 back into the first plastic bag 32 which has been cleaned using the tubing 72 and the control member 66 as illustrated in FIG. 5. This part of the process is called "racking." After the foregoing steps have been completed, the wine should be aged for 6 months, provided the participants in the making of the wine can wait that long before drinking it. At the end of 6 months, (if there is still any wine left,) bracket 66 is inserted into a bracket holder 76 on the inside of one end of the lower half of the barrel 14, as may be seen in FIGS. 2 and 6. The plastic tube 72 is then connected or snapped on to the fitting 36 of bag 32. The other end of it is connected to nipple 30 on the spigot 22. Tube 72 may be underneath the bag 32 in the lower half of the barrel as shown in FIG. 6. The tube is held by the bracket 66. The valve of the spigot may then be manually opened and by merely exerting hand pressure on the bag 32 the wine is forced to flow through the tube 72 and out the spigot. The wine may be stored in the home wine making kit virtually indefinitely.

From the foregoing, those skilled in the art will readily understand the nature and utilization of the invention and the manner in which it achieves and realizes all of the objectives and advantages as set forth in the foregoing. The foregoing is representative of a preferred form of the invention and is to be interpreted in an illustrative rather than a limiting sense, the invention to be accorded the full scope of the claims appended hereto.

What is claimed is:

1. Wine making apparatus comprising: a rigid container formed in separable parts; flexible bag means adapted to be placed within the rigid container and having fittings adapted for communication with openings in the rigid container whereby liquid may be transferred into a bag means while it is within the rigid container and liquid may be dispensed from the bag means, the said bag means being constructed to be disconnectable and readily removable from the container by separating the said parts.

2. Apparatus as in claim 1, wherein the bag means includes a flexible bag having a fitting attachable to an aperture in a part of the rigid container and tube means attachable to the bag means and attachable to a dispensing spigot carried by a part of the rigid container.

3. Apparatus as in claim 2, including a valve member attachable to the aperture in said rigid container adapted to receive bubbling liquid resulting from fermentation within the flexible bag.

4. Apparatus as in claim 3, wherein said tube means and valve means are alternatively attachable to the fitting of the flexible bag.

5. Apparatus as in claim 1, wherein said flexible bag means includes a flexible bag having a fitting attachable to an opening in part of said rigid container and a device attachable to said fitting and adapted to receive bubbling liquid resulting from fermentation within said bag.

6. Apparatus as in claim 1, wherein said rigid container comprises two rigid parts, each having the shape of half a barrel and adapted to be placed one over the other to provide the configuration of a barrel and said rigid container being adapted to contain said flexible bag means.

7. Apparatus as in claim 1, wherein the container parts have mutually engageable portions adapted to interfit and interengage to hold the separable parts together.

8. Wine making apparatus comprising: A rigid container formed in separable parts; flexible bag means adapted to be placed within the rigid container and having fittings adapted for communication with openings in the rigid container whereby liquid may be transferred into a bag means while it is within the rigid container and liquid may be dispensed from the bag means, said bag means including a first and second flexible bag means each adapted to be placed in a part of the rigid container and tube means adapted to be connected for draining liquid from one of the flexible bag means to the other.

9. Wine making apparatus comprising: a rigid container formed in separable parts; flexible bag means adapted to be placed within the rigid container and having fittings adapted for communication with openings in the rigid container whereby liquid may be transferred into a bag means while it is within the rigid container and liquid may be dispensed from the bag means, the said bag means including a flexible bag having a fitting attachable to an aperture in a part of the rigid container, a dispensing spigot carried by a part of the rigid container and tube means attachable to the bag means and to the dispensing spigot, the spigot having a spout, a flexible tube in the spigot connected between the inlet to the spigot and to the spout and a means for pinching the tube to close off the flow.

10. Apparatus as in claim 9, where the spigot has a handle and means rotatable by the handle for pinching the tube in the spigot to close off the flow.

11. Apparatus as in claim 9, wherein the spigot has a nipple attachable to the rigid container and to the first mentioned tube and to the tube within the spigot.

12. Wine making apparatus comprising: a rigid container formed in separable parts; flexible bag means adapted to be placed within the rigid container and having fittings adapted for communication with openings in the rigid container whereby liquid may be transferred into a bag means while it is within the rigid container and liquid may be dispensed from bag means, support feet for the rigid container and removably attachable to both the top and bottom of the container whereby the support feet are adaptable for stacking containers on top of each other.

* * * * *